(12) United States Patent
Yang

(10) Patent No.: US 6,378,325 B1
(45) Date of Patent: Apr. 30, 2002

(54) SALAD BOWL WITH COOLING FUNCTION

(76) Inventor: Heng-Te Yang, P.O. Box 90, Tainan City (TW)

( * ) Notice: Subject to any disclaimer, the term of this patent is extended or adjusted under 35 U.S.C. 154(b) by 0 days.

(21) Appl. No.: 09/928,312

(22) Filed: Aug. 14, 2001

(51) Int. Cl.$^7$ .............................. A23L 1/00; A47F 3/04; F25D 3/02; F25D 3/04; F25D 3/08
(52) U.S. Cl. .................... 62/457.6; 99/352; 99/517; 62/371; 62/457.1
(58) Field of Search .................. 99/352, 455, 516, 99/517; 62/388, 457.6, 371, 372, 457.1, 459, 463, 227, 252, 458, 503, 228.3, 457.2; 165/918, 919, 61, 63, 48.1, 206, 267; 206/519, 550, 545; 220/574.2, 575, 23.4, 23.6, 23.87, 592.01, 533; 312/236; 426/109; D7/505, 504, 540, 557

(56) References Cited

U.S. PATENT DOCUMENTS

| | | | | |
|---|---|---|---|---|
| 2,810,276 A | * | 10/1957 | Murray ....................... | 62/457.6 |
| 3,710,589 A | * | 1/1973 | Brown et al. ............... | 62/457.2 |
| 3,736,981 A | * | 6/1973 | Shevlin ..................... | 99/359 X |
| 4,005,586 A | * | 2/1977 | Lyons ........................ | 62/372 |
| 4,351,164 A | * | 9/1982 | Christiani ................. | 220/23.83 |
| 4,520,633 A | * | 6/1985 | Hoydic ..................... | 62/371 X |
| 4,830,190 A | * | 5/1989 | Inagaki ..................... | 99/517 X |
| 5,231,850 A | * | 8/1993 | Morris ...................... | 62/457.6 |
| 5,247,807 A | * | 9/1993 | Jarman et al. ............. | 99/352 X |
| 5,345,784 A | * | 9/1994 | Bazemore et al. ........ | 62/371 X |
| 5,419,856 A | * | 5/1995 | Shaw ........................ | 99/517 X |
| 5,423,194 A | * | 6/1995 | Senecal ..................... | 62/457.6 |
| 5,718,124 A | * | 2/1998 | Senecal ..................... | 62/457.6 |

* cited by examiner

Primary Examiner—Timothy F. Simone

(57) ABSTRACT

A salad bowl with cooling function in the present invention includes a bowl body and a cover body. The bowl body has a recess and a chamber separated from the recess with a separator and the cover body has a receiving pan. After ice cubes are respectively placed in the recess of the bowl body as well as the receiving pan of the cover body and vegetable or fruit salad is placed in the chamber of the bowl body, the cover body is covered on the bowl body, by which the vegetable or fruit salad will be spread with cool air coming from the ice cubes and penetrating through perforated holes of the separator as well as the receiving pan and thus to be kept fresh in cool temperature in a longer period and tasted more delicious.

2 Claims, 3 Drawing Sheets

SALAD BOWL WITH COOLING FUNCTION

BACKGROUND OF THE INVENTION

1. Field of the Invention

This invention relates to a salad bowl with cooling function, particularly to one provided with a bowl body and a cover body, wherein the bowl body has a recess as well as a chamber and is provided with a separator for separating the recess and the chamber and the cover body has a receiving pan. After ice cubes are respectively placed in the recess of the bowl body as well as the receiving pan of the cover body and vegetable or fruit salad is placed in the chamber of the bowl body, the cover body is covered on the bowl body, by which the vegetable or fruit salad will be spread with cool air coming from the ice cubes and penetrating through perforated holes of the separator as well as the receiving pan and thus to be kept fresh in cool temperature in a longer period and tasted more delicious.

2. Description of the Prior Art

Under the high temperature of summer days, vegetable or fruit salad is often placed in a refrigerator. When the vegetable or fruit salad is removed from the refrigerator, a known conventional way is to place ice cubes directly on the vegetable or fruit salad in a salad bowl for keeping the vegetable or fruit salad cool and fresh in a temporary period. However, the ice cubes directly mixed with the vegetable or fruit salad will soon be melt into water under the heat of summer days, which will reduce the nutriment of the vegetable or fruit salad and, worse than all, make the vegetable or fruit salad become putrefactive in a short time after being continuously soaked in water.

SUMMARY OF THE INVENTION

The main purpose of the invention is to offer a salad bowl with cooling function capable of keeping vegetable or fruit salad fresh in cool temperature in a longer period and making vegetable or fruit salad taste more delicious.

A main feature of the invention is to provide a salad bowl having a bowl body covered with a cover body at the top of the bowl body, wherein the bowl body has a recess disposed in the bottom of the bowl body, a chamber disposed above the recess, and a neck disposed between the recess as well as the chamber and having a separator located therein for separating the recess and the chamber; the separator has a plurality of perforated holes arranged thereon and a flange disposed at the bottom of the separator.

Another main feature of the invention is to provide a salad bowl having a bowl body covered with a cover body at the top of the bowl body, wherein the cover body has a connecting base disposed in the inner surface of the cover body for being combined with a receiving pan; the receiving pan has a recess disposed therein and a plurality of perforated holes arranged in the circumferential wall of the receiving pan.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
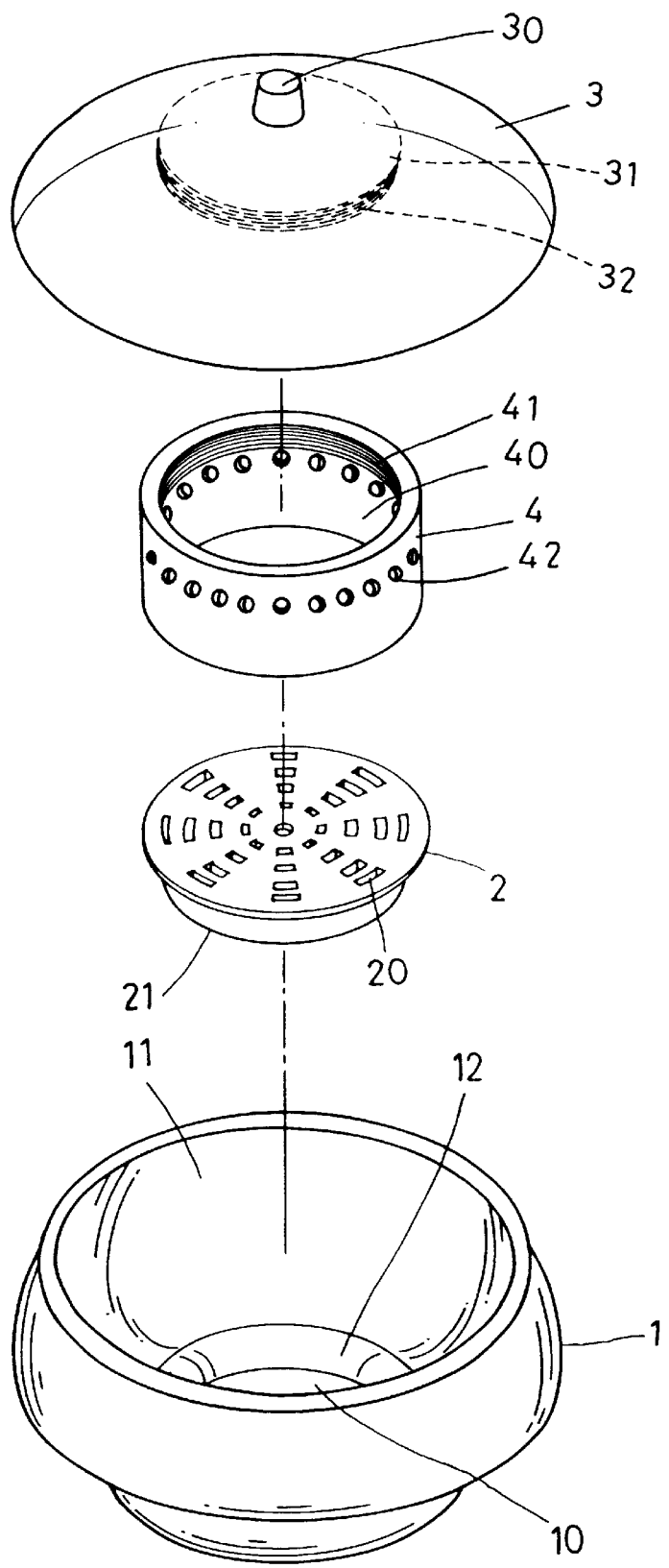
FIG. 1 is an exploded perspective view of a salad bowl with cooling function in the present invention.

A first preferred embodiment of a salad bowl with cooling function in the present invention, as shown in FIG. 1, includes a bowl body 1, a separator 2 and a cover body 3 and a receiving pan 4.

The bowl body 1 has a recess 10 disposed in the bottom of the bowl body 1, a chamber 11 having a larger diameter and being disposed above the recess 10, and a neck 12 having a diameter smaller than that of an opening of the bowl body 1 and being disposed between the recess 10 as well as the chamber 11.

The separator 2 located in the neck 12 of the bowl body 1 has a plurality of perforated holes 20 arranged thereon and a flange 21 disposed at the bottom of the separator 2.

The cover body 3 covered on the bowl body 1 has a knob 30 disposed at the top of the cover body 3, and a connecting base 31 disposed in the inner surface of the cover body 3 and provided with external threads 32 in the outer wall surface of the connecting base 31.

The receiving pan 4 combined with the connecting base 31 of the cover body 3 has a recess 40 disposed therein and provided with internal threads 41 in the inner wall surface of the recess 40, and a plurality of perforated holes 42 in the circumferential wall of the receiving pan 4.

Figure 2:
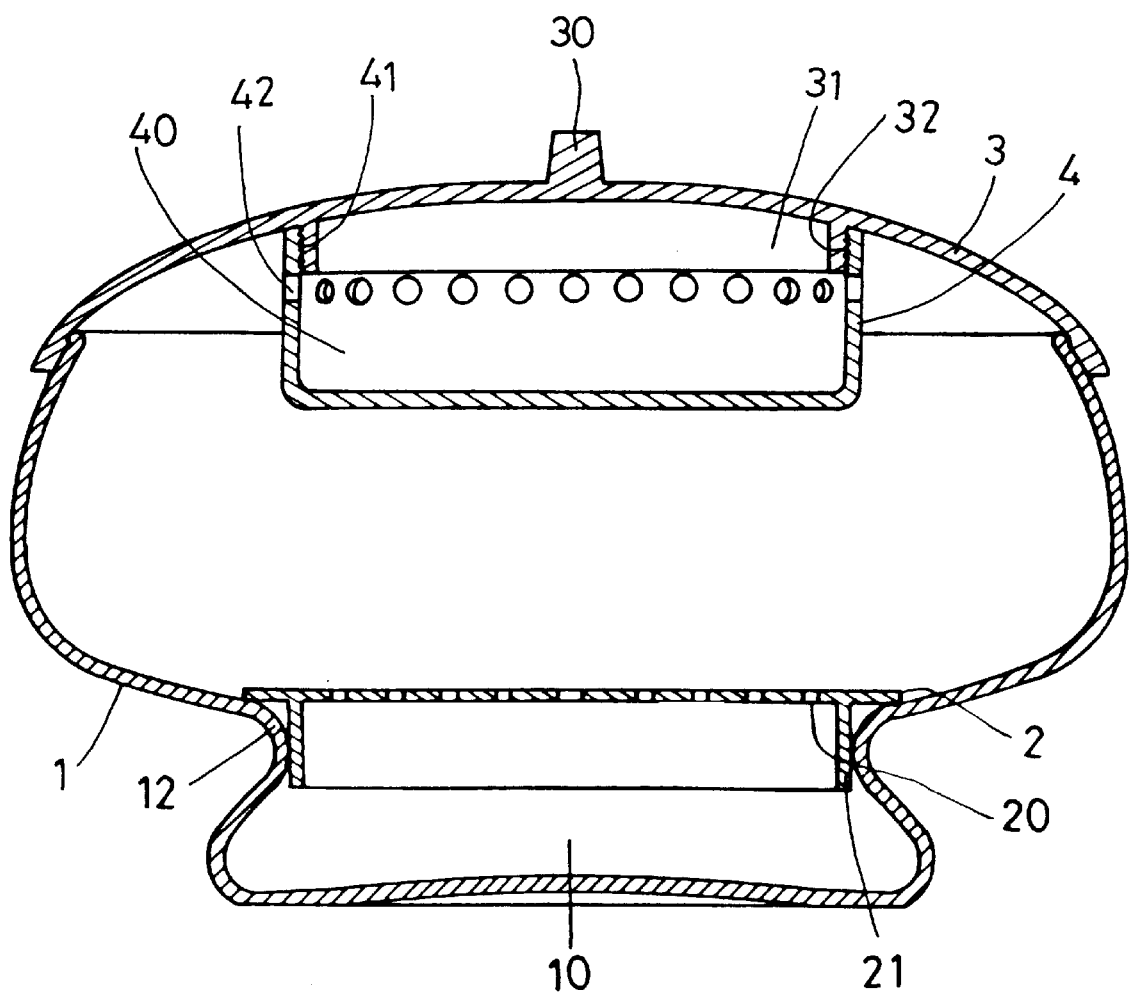
FIG. 2 is a side cross-sectional view of the salad bowl with cooling function in the present invention; and, FIG. 3 is a schematic view showing the usage of the salad bowl with cooling function in the present invention.
Figure 3:
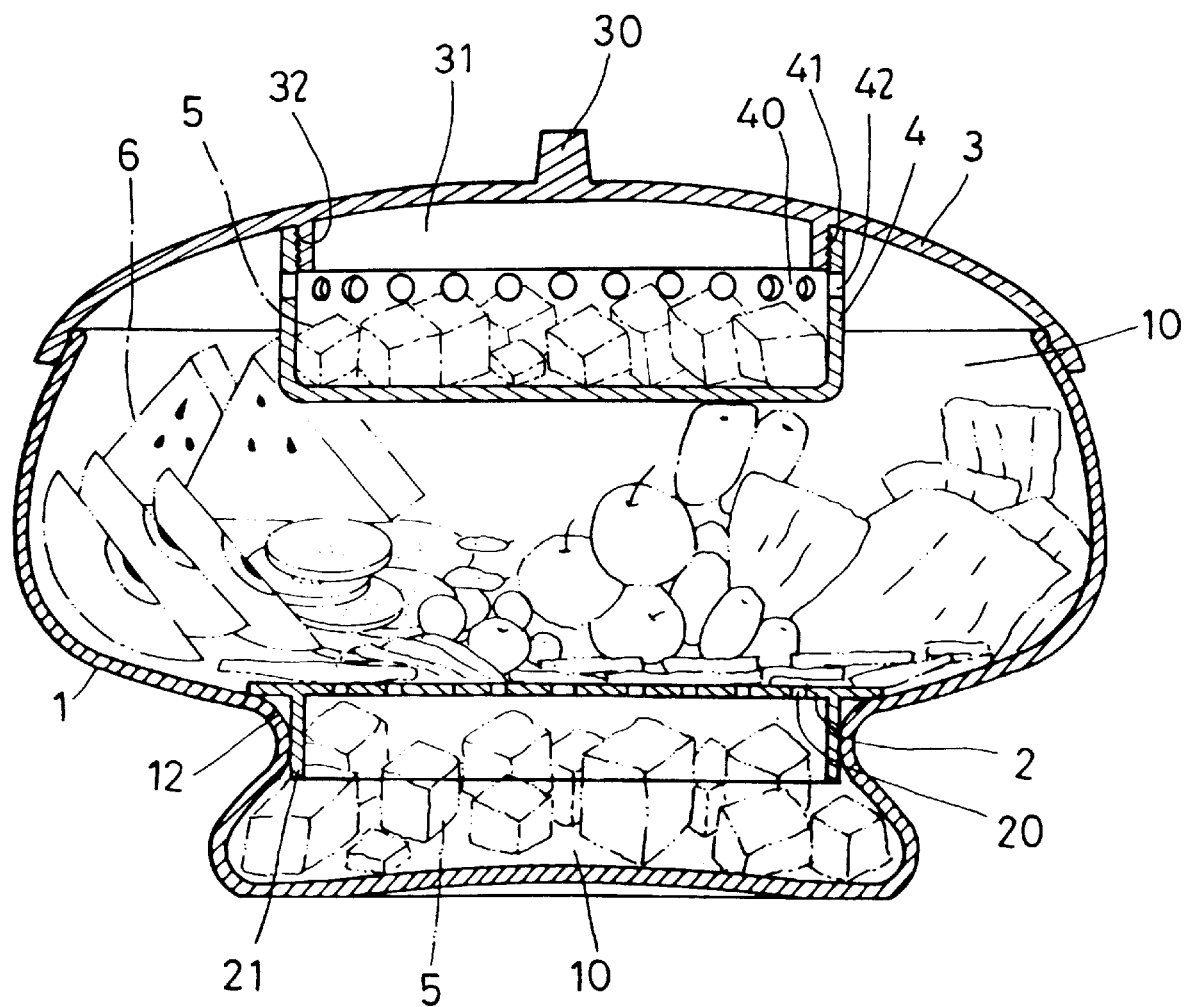

In assembling, referring to FIGS. 2 and 3, firstly locate the separator 2 in the neck 12 disposed between the chamber 11 and the recess 10 of the bowl body 1 and make the flange 21 close against the inner wall surface of the neck 12 of the bowl body 1. Secondly, combine he receiving pan 4 with the connecting base 31 disposed in the inner surface of the cover body 3 by screwing the internal threads 41 of the receiving pan 4 with the external threads 32 of the connecting base 31 of the cover body 3, by which an assemblage of the whole structure of the salad bowl with cooling function in the present invention is completed.

In using, referring to FIG. 3, firstly place ice cubes 5 respectively in the recess 10 of the bowl body 1 and the recess 40 of the receiving pan 4. Secondly, locate the separator 2 in the neck 12 of the bowl body 1 to separate the recess 10 and the chamber 11 of the bowl body 1. Thirdly, place vegetable or fruit salad 6 in the chamber 11 of the bowl body 1 above the separator 2. Finally, cover the cover body 3 at the top of the bowl body 1, by which the vegetable or fruit salad 6 will be spread with cool air coming from the ice cubes 5 and penetrating through the plurality of perforated holes 20 of the separator 2 as well as the plurality of perforated holes 42 of the receiving pan 4 so as to keep the vegetable or fruit salad 6 fresh in cool temperature in a longer period and to make the vegetable or fruit salad 6 taste more delicious. Moreover, the water melt from the ice cubes 5 under the heat of the summer days will be limited to be stored respectively in the recess 10 of the bowl body 1 and the recess 40 of the receiving pan 4 without the possibility of being directly mixed with the vegetable or fruit salad 6 and making the vegetable or fruit salad 6 become putrefactive after being continuously soaked in water, by which the vegetable or fruit salad 6 can be kept fresh in a longer period.

The bowl body 1 and the cover body 3 in the invention can be used independently. Even if only covered with a general cover, the bowl body 1 can achieve the function of keeping food fresh in cool temperature by placing the ice cubes 5 in the recess 10 of the bowl body 1 and providing food with cool air coming from the ice cubes 5 and penetrating through the plurality of perforated holes 20 of the separator 2. Even if only covered with a general bowl, the cover body 3 combined with the receiving pan 4 can also achieve the function of keeping food fresh in cool temperature by placing the ice cubes 5 in the recess 40 of the receiving pan 4 and providing food with cool air coming from the ice cubes 5 and penetrating through the plurality of the perforated holes 42 of the receiving pan 4.

Moreover, instead of the external threads 32 of the connecting base 31 of the cover body 3 and the internal threads 41 of the receiving pan 4, a plurality of engaged seats can be disposed in the outer wall surface of the connecting base 31 of the cover body 3 and a plurality of engagement portions can be disposed in the inner wall surface of the recess 40 of the receiving pan 4, by which the plurality of engaged seats and the plurality of engagement portions can be engaged to each other so as to combine the receiving pan 4 with the connecting base 31 of the cover body 3. Or, a grooved ring can be disposed in the outer wall surface of the connecting base 31 of the cover body 3 and a plurality of tongue portions can be disposed in the inner wall surface of the recess 40 of the receiving pan 4, by which the plurality of tongue portions can be engaged into the grooved ring so as to combine the receiving pan 4 with the connecting base 31 of the cover body 3.

While the preferred embodiment of the invention has been described above, it will be recognized and understood that various modifications may be made therein and the appended claims are intended to cover all such modifications that may fall within the spirit and scope of the invention.

What is claimed is:

1. A salad bowl with cooling function comprising:
a bowl body covered with a cover body at a top of said bowl body, wherein said bowl body has a recess disposed in a bottom of said bowl body, a chamber disposed above said recess, and a neck disposed between said recess as well as said chamber and having a separator located therein for separating said recess as well as said chamber; said separator has a plurality of perforated holes arranged thereon and a flange disposed at a bottom of said separator; and, whereby after ice cubes are placed in said recess of said bowl body and vegetable or fruit salad is placed in said chamber of said bowl body above said separator, said vegetable or fruit salad will be spread with cool air coming from said ice cubes and penetrating through said plurality of perforated holes of said separator and thus to be kept fresh in cool temperature in a longer period and tasted more delicious.

2. A salad bowl with cooling function comprising:
a bowl body covered with a cover body at a top of said bowl body, wherein said cover body has a connecting base disposed in an inner surface of said cover body for being combined with a receiving pan; said receiving pan has a recess disposed therein and a plurality of perforated holes arranged in a circumferential wall of said receiving pan; and, whereby said receiving pan is combined with said connecting base of said cover body after ice cubes are placed in said recess of said receiving pan, and then said cover body is covered at a top of said bowl body having been accommodated with vegetable or fruit salad so that said vegetable or fruit salad will be spread with cool air coming from said ice cubes and penetrating through said plurality of perforated holes of said receiving pan and thus to be kept fresh in cool temperature in a longer period and tasted more delicious.

\* \* \* \* \*